US012674546B2

(12) United States Patent
Werlen et al.

(10) Patent No.: US 12,674,546 B2
(45) Date of Patent: Jul. 7, 2026

(54) DEVICE AND METHOD FOR FILLING A PRESSURIZED-GAS TANK

(71) Applicant: L'Air Liquide, Société Anonyme pour l'Etude et l'Exploitation des Procédés Georges Claude, Paris (FR)

(72) Inventors: Etienne Werlen, Versailles (FR); David Vempaire, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 27 days.

(21) Appl. No.: 18/689,594

(22) PCT Filed: Sep. 1, 2022

(86) PCT No.: PCT/EP2022/074338
§ 371 (c)(1),
(2) Date: Mar. 6, 2024

(87) PCT Pub. No.: WO2023/031336
PCT Pub. Date: Mar. 9, 2023

(65) Prior Publication Data

US 2024/0392923 A1 Nov. 28, 2024

(30) Foreign Application Priority Data

Sep. 6, 2021 (FR) ...................................... 2109311

(51) Int. Cl.
*F17C 5/02* (2006.01)
*F17C 13/04* (2006.01)

(52) U.S. Cl.
CPC ................ *F17C 5/02* (2013.01); *F17C 13/04* (2013.01); *F17C 2221/012* (2013.01);
(Continued)

(58) Field of Classification Search
CPC ...... F17C 5/02; F17C 13/04; F17C 2221/012; F17C 2223/0123; F17C 2227/0388;
(Continued)

(56) References Cited

U.S. PATENT DOCUMENTS 8,020,589 B2 * 9/2011 Cohen .................. F17C 13/025
141/234
9,574,709 B2 * 2/2017 Seki ........................ F25D 17/02
(Continued)

FOREIGN PATENT DOCUMENTS

EP 3 457 019 3/2019
JP 2015 092108 5/2015
(Continued)

OTHER PUBLICATIONS

JP-2016053457-A English Translation of Specification (Year: 2025).*
(Continued)

*Primary Examiner* — Kenneth Rinehart
*Assistant Examiner* — Stephanie A Shrieves
(74) *Attorney, Agent, or Firm* — Elwood L. Haynes

(57) ABSTRACT

The invention relates to a device and a method for filling pressurized-gas tanks, including a distributor, to feed a tank with pressurized gas, a refrigeration system including a circuit of refrigerant fluid and a heat exchanger for exchanging heat between the heat-transfer fluid and the flow of gas in the distributor, the circuit of heat-transfer fluid including, in series in a loop, a reserve of heat-transfer fluid, a member for setting the heat-transfer fluid in circulation in the circuit, and at least one evaporator ensuring heat exchange between the heat-transfer fluid and a source of cold, a bypass portion and a set of bypass valves allowing all or part of the heat-transfer fluid to bypass the heat exchanger of the distributor thereby cooling the heat-transfer fluid in the
(Continued)

reserve and to accumulate cold energy therein independently of the need for cold energy in the distributor.

7 Claims, 2 Drawing Sheets

(52) U.S. Cl.
CPC ................. *F17C 2223/0123* (2013.01); *F17C 2227/0388* (2013.01); *F17C 2270/0168* (2013.01)

(58) Field of Classification Search
CPC ........ F17C 2270/0168; F17C 2201/032; F17C 2201/054; F17C 2201/058; F17C 2205/0329; F17C 2205/0332; F17C 2205/0335; F17C 2205/0382; F17C 2205/0394; F17C 2221/013; F17C 2221/014; F17C 2223/036; F17C 2225/036; F17C 2270/0736; F17C 5/06
USPC ................................................................ 141/4
See application file for complete search history.

(56) References Cited

U.S. PATENT DOCUMENTS

| | | | | |
|---|---|---|---|---|
| 10,247,358 | B2 * | 4/2019 | Allidieres | F17C 5/06 |
| 10,571,077 | B2 * | 2/2020 | Seki | F25D 29/001 |
| 10,655,784 | B2 * | 5/2020 | Fujisawa | F17C 9/04 |
| 11,079,069 | B2 * | 8/2021 | Werlen | F17C 7/00 |
| 11,933,458 | B1 * | 3/2024 | Fairy | F17C 5/04 |
| 2016/0281928 | A1 * | 9/2016 | Yoshida | F17C 5/06 |
| 2018/0038550 | A1 * | 2/2018 | Kondo | E02F 9/261 |
| 2019/0086031 | A1 * | 3/2019 | Fujisawa | B60K 15/067 |
| 2020/0041070 | A1 | 2/2020 | Werlen et al. | |
| 2020/0041072 | A1 * | 2/2020 | Werlen | F25B 9/008 |

FOREIGN PATENT DOCUMENTS

| | | | |
|---|---|---|---|
| JP | 2015 158213 | | 9/2015 |
| JP | 2016053457 A | * | 4/2016 |
| KR | 2021 0094731 | | 7/2021 |

OTHER PUBLICATIONS

International Search Report for corresponding PCT/EP2022/074338, Dec. 12, 2022.

* cited by examiner

[Fig. 1]
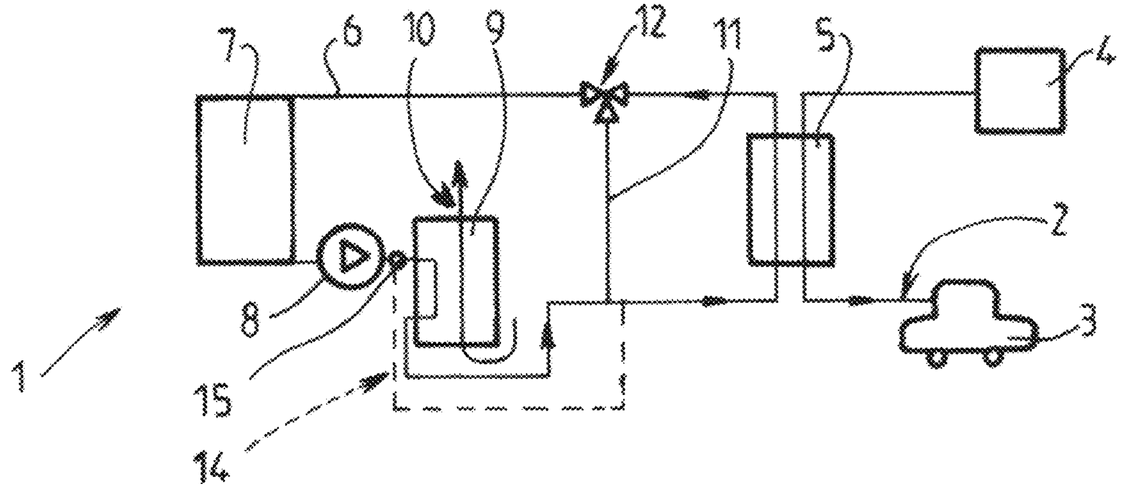
[Fig. 2]
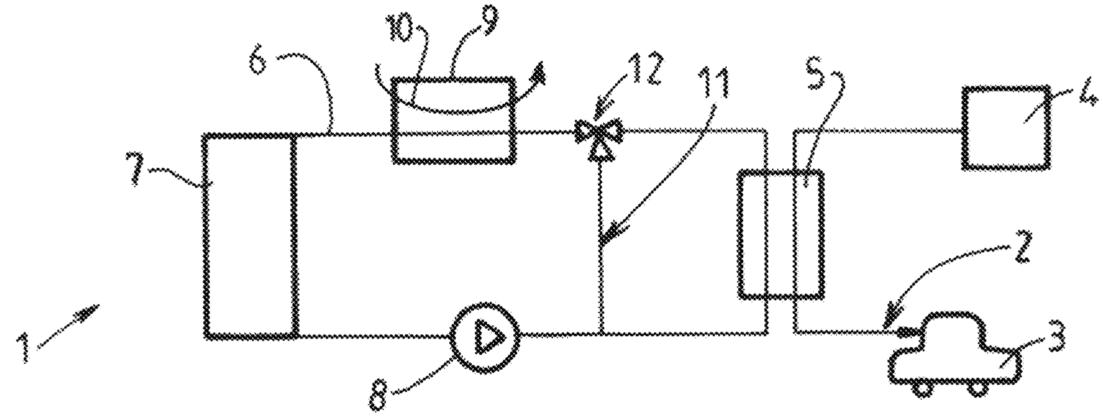
[Fig. 3]
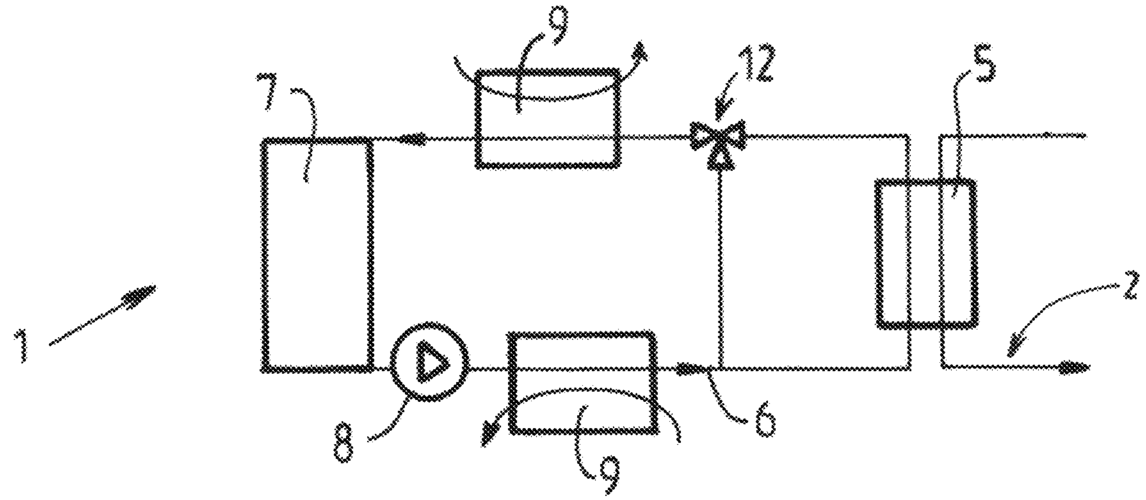

[Fig. 4]
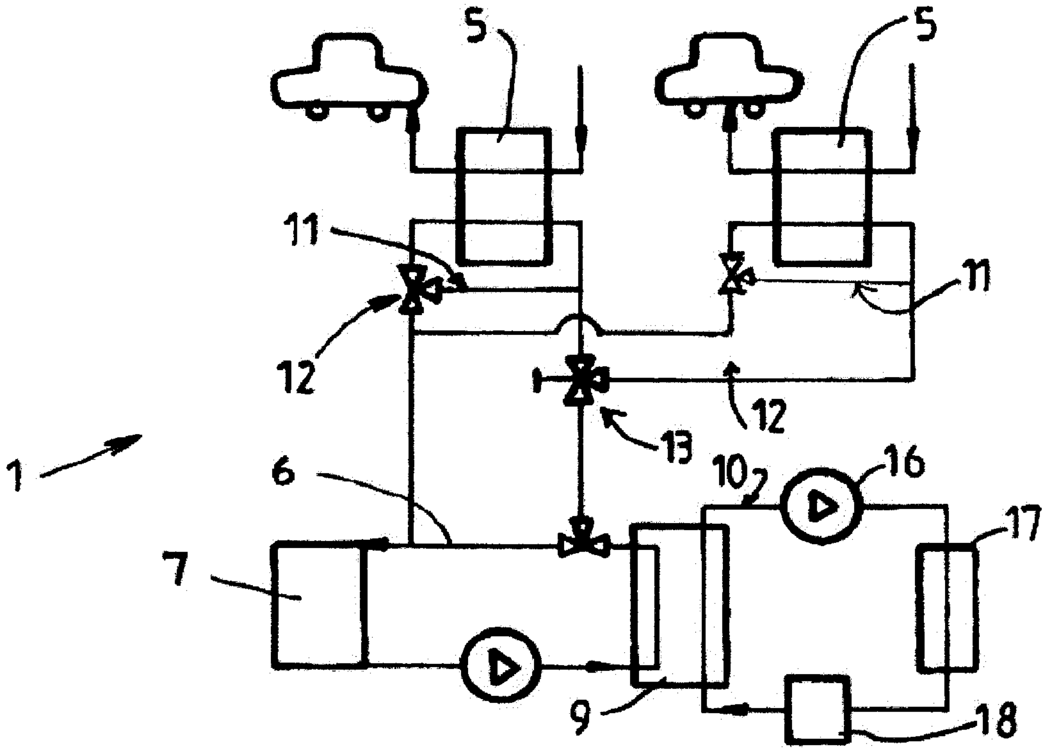

DEVICE AND METHOD FOR FILLING A PRESSURIZED-GAS TANK

CROSS REFERENCE TO RELATED APPLICATIONS

This application is a 371 of International Application No. PCT/EP2022/074338, filed Sep. 1, 2022, which claims priority to French Patent Application No. 2109311, filed Sep. 6, 2021, the entire contents of which are incorporated herein by reference.

BACKGROUND

The invention relates to a device and a method for filling a pressurized-gas tank. The invention relates more particularly to a device for filling pressurized-gas tanks comprising a distributor intended to supply a tank with pressurized gas from a source of fluid, the device comprising a refrigeration system for cooling the flow of gas in the distributor, the refrigeration system comprising a circuit of refrigerant fluid, such as brine, and a heat exchanger ensuring an exchange of heat between the heat-transfer fluid and the flow of gas in the distributor, the circuit of heat-transfer fluid comprising, arranged in series in a loop, a reserve of heat-transfer fluid, a member for circulating the heat-transfer fluid in the circuit and at least one evaporator ensuring a thermal exchange between the heat-transfer fluid and a source of cold energy.

A first mode of cooling the hydrogen in or upstream of the distributor of a filling station consists in supplying a heat exchanger with an antifreeze heat-transfer fluid, typically a brine. This heat-transfer (or refrigerant) fluid is itself cooled in the evaporator of a refrigeration unit (cf. for example JP2015092108A).

In a second embodiment, there is one single loop originating from the brine tank and successively passing through the evaporator of the refrigeration unit and through the exchanger of the distributor (cf. for example EP3457019A1).

This second embodiment is generally more efficient. This is because, at a given brine temperature, the exchanger of the distributor may be supplied at a lower temperature since the evaporator provides additional cooling by being interposed between the brine tank and the exchanger of the distributor. In addition, for a given cooling target for the hydrogen, since the evaporator is supplied with warmer brine, the evaporation temperature of the refrigerant may be higher and therefore the performance coefficient of the refrigeration unit is increased. In addition, with a given compressor size for the refrigeration unit, the second embodiment allows the hydrogen to be cooled at a lower temperature and/or provides a greater cooling capacity.

One aim of the present invention is to overcome all or some of the disadvantages of the prior art that are set out above.

To this end, the device according to the invention, which is otherwise in accordance with the generic definition thereof given in the preamble above, is essentially characterized in that the circuit comprises a bypass portion and a set of one or more bypass valves allowing all or some of the heat-transfer fluid to avoid passing through the heat exchanger of the distributor in order to cool the heat-transfer fluid in the reserve and to accumulate cold energy therein independently of the need for cold energy in the distributor.

Moreover, embodiments of the invention may comprise one or more of the following features:

- depending on the direction of circulation of the heat-transfer fluid in the circuit of heat-transfer fluid, the at least one evaporator is located between the reserve and the heat exchanger of the distributor, downstream of the fluid-circulating member and upstream of the heat exchanger of the distributor,
- depending on the direction of circulation of the heat-transfer fluid in the circuit of heat-transfer fluid, the at least one evaporator is located between the heat exchanger of the distributor and the reserve, that is to say downstream of the heat exchanger of the distributor and upstream of the reserve,
- the circuit of heat-transfer fluid comprises two evaporators respectively arranged upstream and downstream of the reserve, a first evaporator located between the reserve and the heat exchanger of the distributor, and a second evaporator between the heat exchanger of the distributor and the reserve,
- the circuit of heat-transfer fluid comprises a bypass of the at least one evaporator and a set of one or more valves in order to allow the heat exchanger of the distributor to be supplied directly from the reserve,
- the device comprises a plurality of distributors intended to supply separate tanks and each comprising a heat exchanger, the circuit of heat-transfer fluid being common to the plurality of distributors and comprising a set of parallel branches respectively passing through the various heat exchangers and a set of one or more distribution valves for controlling the flow of heat-transfer fluid to the one or more heat exchangers, the device comprising a bypass portion and a set of one or more valves for all or some of the heat exchangers.

The invention also relates to a method for filling a pressurized-gas tank by means of a device according to any one of the features above or below, wherein a flow of gas is circulated in the distributor and through the heat exchanger and a flow of heat-transfer fluid is also circulated in the circuit of heat-transfer fluid and passes through the heat exchanger (5) of the distributor.

According to possible particular features, the method comprises a step of circulating at least some of the heat-transfer fluid in the bypass portion without passing through the heat exchanger of the distributor in order to cool the heat-transfer fluid in the reserve and/or to reduce the cold energy capacity provided to the heat exchanger. The invention may also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein: FIG. 1 shows a schematic, partial view illustrating one possible example of the structure and operation of the invention according to a first embodiment, FIG. 2 shows a schematic, partial view illustrating one possible example of the structure and operation of the invention according to a second embodiment, FIG. 3 shows a schematic, partial view illustrating one possible example of the structure and operation of the invention according to a third embodiment, FIG. 4 shows a schematic, partial view illustrating one possible example of the structure and operation of the invention according to a fourth embodiment.

DETAILED DESCRIPTION OF PREFERRED EMBODIMENTS

The device 1 for filling pressurized-gas tanks illustrated is, for example, a station for filling pressurized-hydrogen tanks. This device 1 comprises a distributor 2 (hose equipped with a nozzle, for example) intended to supply a tank 3 with pressurized gas from a source 4 of fluid (one or more storage units and/or one or more compressors and/or the like).

The device 1 comprises a refrigeration system for cooling the flow of gas in the distributor 2. This refrigeration system comprises a circuit 6 of heat-transfer fluid, such as brine, and a heat exchanger 5 ensuring an exchange of heat between the flow of heat-transfer fluid and the flow of gas in the distributor 2. The heat exchanger 5 may comprise a conductive mass that may be pre-cooled by the heat-transfer fluid in order to increase the thermal inertia of the cooling (and, if necessary, to provide cooling even without the simultaneous passage of heat-transfer fluid).

The circuit 6 of heat-transfer fluid is, for example, a closed loop and comprises, arranged in series in the loop, a reserve 7 of heat-transfer fluid (for example a brine reserve), a member 8 for circulating the heat-transfer fluid in the circuit 6 (for example a pump) and an evaporator 9 ensuring a thermal exchange between the heat-transfer fluid and a source 10 of cold energy (for example a heat exchanger).

The circuit comprises a heat exchanger bypass portion 11 and a set of one or more heat exchanger bypass valves 12 allowing all or some of the heat-transfer fluid to avoid passing through the heat exchanger 5 of the distributor 2. This heat exchanger bypass of the flow without passing through the heat exchanger 5 allows the heat-transfer fluid in the reserve 7 to be cooled and allows cold energy to be accumulated therein independently of the need for cold energy in the distributor 2. That is to say that the circulation of the heat-transfer fluid in the circuit without passing through the heat exchanger 5 allows this heat-transfer fluid to be cooled. This bypass also allows the amount of cold energy supplied to the hydrogen in the heat exchanger 5 to be regulated. That is to say that this bypass allows the cold energy capacity provided to the heat exchanger 5 to be controlled (reduced).

It should be noted that, as shown schematically in dashed lines in FIG. 1, it is possible to also envision an evaporator bypass 14 of the evaporator 9 and a set of one or more evaporator bypass valves 15 in order to allow the heat exchanger 5 of the distributor 2 to be supplied directly from the reserve 7. If the evaporator 9 has heated up following prolonged shutdown, this would allow the heat-transfer fluid not to be heated while the refrigeration unit 10 is starting up.

In the embodiment in FIG. 1, the evaporator 9 is located between the reserve 7 and the heat exchanger 5 of the distributor 5, downstream of the fluid-circulating member 8 and upstream of the heat exchanger 5 of the distributor (depending on the direction of circulation of the heat-transfer fluid in the circuit 6 of heat-transfer fluid).

In the embodiment in FIG. 2, the evaporator 9 is located between the heat exchanger 5 of the distributor 5 and the reserve 7, downstream of the heat exchanger 5 of the distributor 5 and upstream of the reserve 7 (depending on the direction of circulation of the heat-transfer fluid in the circuit 6 of heat-transfer fluid).

As illustrated in the embodiment in FIG. 3, the circuit 6 of heat-transfer fluid may comprise two evaporators 9, a first evaporator 9 located downstream of the reserve 7 and upstream of the heat exchanger 5, for example between the fluid-circulating member 8 and the heat exchanger 5 of the distributor 5, and a second evaporator 9 located between the heat exchanger 5 of the distributor 2 and the reserve 7.

As illustrated in the embodiment in FIG. 4, the device may comprise a plurality of distributors 2 intended to supply separate tanks 3, for example simultaneously or non-simultaneously, and each comprising a heat exchanger 5. The circuit 6 of heat-transfer fluid is common to the plurality of distributors 2 and comprises a set of parallel branches respectively passing through the various heat exchangers 5 and a set of one or more distribution valves 13 for controlling the flow of heat-transfer fluid to the one or more heat exchangers 5. As illustrated, the device 1 may comprise a heat exchanger bypass portion 11 and a set of one or more heat exchanger bypass valves 12 as described above for each of the heat exchangers 5.

It should be noted that FIG. 4 describes a non-limiting example of the source 10 of cold energy in a little more detail. In this example, the source of cold energy comprises a circuit, in the form of a loop, of a refrigerant, said circuit comprising a pump 16, an evaporator 17, a reserve 18 of refrigerant and then a passage through the evaporator 9 that cools the brine circulating in the circuit 6 of heat-transfer fluid. This type of source of cold energy may be used in the other embodiments.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device for filling pressurized-gas tanks, comprising:
   - a plurality of distributors configured to supply a tank with pressurized gas from a source of fluid,
   - the device comprising a refrigeration system for cooling the flow of gas in the plurality of distributors,
   - the refrigeration system comprising a circuit of refrigerant fluid and a heat exchanger configured to provide an exchange of heat between a heat-transfer fluid and the flow of gas in the plurality of distributors,
   - the circuit of heat-transfer fluid comprising, arranged in series in a loop,
     - a reserve of heat-transfer fluid,
     - a member for circulating the heat-transfer fluid in the circuit and
     - at least one evaporator configured to provide a thermal exchange between the heat-transfer fluid and a source of cold,
   - the plurality of distributors configured to supply separate tanks and each comprising a heat exchanger,
   - the circuit of heat-transfer fluid being common to the plurality of distributors and comprising a set of parallel branches respectively passing through the various heat exchangers and
   - a set of one or more distribution valves for controlling the flow of heat-transfer fluid to the one or more heat exchangers, and
   - the device comprising a heat exchanger bypass portion (11) and a set of one or more heat exchanger bypass valves (12) for all or some of the heat exchangers, wherein the circuit comprises the heat exchanger bypass portion (11) and the set of one or more heat exchanger bypass valves (12) allowing all or some of the heat-transfer fluid to avoid passing through the heat exchanger of one or more distributor(s) of the plurality of distributors thereby configured to cool the heat-transfer fluid in the reserve and to accumulate cold energy therein independently of the need for cold energy in the distributor.

2. The device as claimed in claim 1 wherein, depending on the direction of circulation of the heat-transfer fluid in the circuit of heat-transfer fluid, the at least one evaporator is located between the reserve and the heat exchanger of the distributor, downstream of the fluid-circulating member and upstream of the heat exchanger of the distributor.

3. The device as claimed in claim 1, wherein, depending on the direction of circulation of the heat-transfer fluid in the circuit of heat-transfer fluid, the at least one evaporator is located between the heat exchanger of the distributor and the reserve, thus downstream of the heat exchanger of the distributor and upstream of the reserve.

4. The device as claimed in claim 1, wherein the circuit of heat-transfer fluid comprises:

two evaporators respectively arranged upstream and downstream of the reserve, a first evaporator located between the reserve and the heat exchanger of the distributor, and a second evaporator between the heat exchanger of the distributor and the reserve.

5. The device as claimed in claim 1, wherein the circuit of heat-transfer fluid further comprises:

an evaporator bypass (14) of the at least one evaporator (9) and a set of one or more evaporator bypass valves (15) in order to allow the heat exchanger of the distributor to be supplied directly from the reserve.

6. A method for filling a pressurized-gas tank by means of a device as claimed in claim 1, the method comprising:

wherein a flow of gas is circulated in the distributor and through the heat exchanger and a flow of heat-transfer fluid is also circulated in the circuit of heat-transfer fluid and passes through the heat exchanger of the distributor.

7. The method as claimed in claim 6, further comprising:

a step of circulating at least some of the heat-transfer fluid in the heat exchanger bypass portion (11) without passing through the heat exchanger of the distributor thereby cooling the heat-transfer fluid in the reserve and/or to reduce the cold capacity provided to the heat exchanger.

* * * * *